(No Model.)
C. ANDERSEN.
MASHING APPARATUS.
No. 332,774.  Patented Dec. 22, 1885.
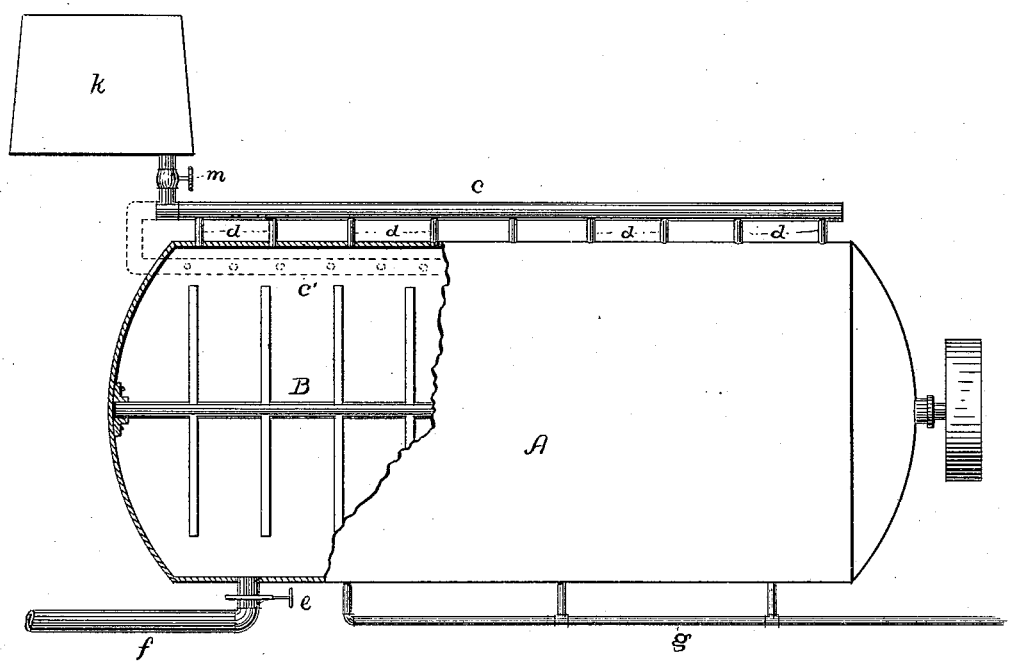
Witnesses:
A. B. Upham.
A. Keithley
Inventor,
Christian Andersen
N. PETERS, Photo-Lithographer, Washington, D. C.

UNITED STATES PATENT OFFICE.

CHRISTIAN ANDERSEN, OF NEW YORK, N. Y.

MASHING APPARATUS.

SPECIFICATION forming part of Letters Patent No. 332,774, dated December 22, 1885.

Application filed March 20, 1885. Serial No. 159,530. (No model.)

*To all whom it may concern:*

Be it known that I, CHRISTIAN ANDERSEN, of New York, in the county of New York, in the State of New York, have invented an Improvement in Mashing Apparatus; and I do hereby declare that the following is a full, clear, and exact description thereof, reference being had to the annexed drawing, making a part of this specification, in which like letters of reference refer to like parts, and in which—

The figure represents a mashing apparatus.

A represents the cylindrical apparatus; B, stirrer; c, main small-grain pipe; d, branches on small-grain pipe; e, discharge-gate; f, discharge-pipe; k, small-grain tub; m, valve on small-grain pipe; g, steam pipe.

The object of this invention is to promote a better sugar-conversion of grain mashes, made in distilleries in a horizontal mashing apparatus, by causing an equal distribution of the small grain simultaneously throughout the whole of the mash in the mashing apparatus.

The operation is carried on as follows: Meal is let into mashing apparatus A and mixed with slop or water. At the proper temperature for the small grain the valve m is opened and the small grain, previously prepared and mixed with water in tub k, is now let into the mash in mashing apparatus through pipe c and branches d. As the combined area of branches d are about equal to that of pipe c, the small grain is distributed equally and simultaneously over the top of the mash, and by thorough mixing a perfect conversion takes place, and an increased yield of whisky is the advantage obtained. It is not necessary to make branches in pipe c. Each small pipe d can be carried direct to the small-grain tube. Another way of accomplishing the result is shown in dotted pipe c', which is the small-grain pipe carried inside the mashing apparatus and perforated throughout its whole length.

The only feature of the invention is to cause an equal and simultaneous distribution of the small grain throughout the whole mash by letting it into the mashing apparatus in various places throughout the whole length of same, instead of in only one place, as now is done.

I am aware that a single pipe has been used for conveying the small grain from the small-grain tub to the mash-tub since 1872, and also that perforated and multi-branched pipes have long been in use for various purposes; but, so far as I am aware, there has never been used prior to my invention thereof a many-branched pipe for distributing the small grain simultaneously to the entire mash.

Having thus described my invention, what I claim as new, and desire to secure by Letters Patent, is the following claims, to wit:

1. The combination, with the mashing apparatus provided with suitable stirrer, and the small-grain tub, of the small-grain pipe connected to said tub and having several branches, whereby to introduce the small grain simultaneously throughout the mash, substantially as and for the purpose set forth.

2. In a mashing apparatus, the combination, with the cylinder, the stirrer adapted to revolve within said cylinder, and the steam-pipe having branches entering the bottom of said cylinder, of the small-grain pipe c, having several branches, d, connected at several points to the top of said cylinder, whereby the small grain is distributed simultaneously and equally throughout the entire mash, as herein described.

In testimony whereof I have hereunto set my hand and affixed my seal, in the presence of witnesses this 16th day of March, 1885.

CHRISTIAN ANDERSEN. [L. S.]

Witnesses:
  A. B. UPHAM,
  ARTHUR KEITHLEY.